United States Patent
Goldstein et al.

(10) Patent No.: US 9,953,546 B1
(45) Date of Patent: Apr. 24, 2018

(54) PHYSICAL CODING BLOCKS

(71) Applicant: Google Inc., Mountain View, CA (US)

(72) Inventors: Jayme Ross Goldstein, London (GB);
Joao Santos Wilbert, London (GB);
Stavros Vranakis, Hove (GB)

(73) Assignee: Google LLC, Mountain View, CA (US)

( * ) Notice: Subject to any disclaimer, the term of this patent is extended or adjusted under 35 U.S.C. 154(b) by 717 days.

(21) Appl. No.: 14/314,266

(22) Filed: Jun. 25, 2014

Related U.S. Application Data

(60) Provisional application No. 61/978,373, filed on Apr. 11, 2014.

(51) Int. Cl.
*A63H 33/08* (2006.01)
*G09B 19/00* (2006.01)
*A63H 11/00* (2006.01)

(52) U.S. Cl.
CPC ......... *G09B 19/0053* (2013.01); *A63H 11/00* (2013.01)

(58) Field of Classification Search
CPC ............................... A63H 11/00; G09B 19/00
USPC ......................................................... 446/330
See application file for complete search history.

(56) References Cited

U.S. PATENT DOCUMENTS

| | | | |
|---|---|---|---|
| 5,823,782 A * | 10/1998 | Marcus ..................... | G09B 1/06 434/156 |
| 6,464,503 B1 * | 10/2002 | Heit ......................... | G09B 1/06 434/156 |
| 7,316,567 B2 | 1/2008 | Hsieh | |
| 7,724,236 B2 | 5/2010 | Weil | |
| 8,221,182 B2 | 7/2012 | Seymour | |
| 8,257,157 B2 | 9/2012 | Polchin | |
| 9,128,661 B2 * | 9/2015 | Zilber ................ | A63F 3/00643 |
| 2005/0026537 A1 * | 2/2005 | Hsieh ..................... | A63H 33/08 446/330 |

OTHER PUBLICATIONS

"Alice.org," [online][Retrieved on Apr. 3, 2014]; Retrieved from the Internet URL: http://www.alice.org/index.php, 1 page.
(Continued)

*Primary Examiner* — Eddy Saint-Vil
*Assistant Examiner* — Alvin Carlos
(74) *Attorney, Agent, or Firm* — Fish & Richardson P.C.

(57) ABSTRACT

Methods, systems, and apparatus, including computer programs encoded on a computer storage medium, for generating a sequence of commands from interconnected code blocks. In one aspect, a system includes a sequencer block that connects to a sequence of coding blocks representative of a control flow and establish data communication with the sequence of coding blocks. The sequencer block includes coding circuitry that receives coding data from the sequence of coding blocks coding data, the coding data representative of instruction code to which the coding blocks corresponds, and generates from the received coding data command data that is representative of a sequence of commands that corresponds to a control flow of which the code blocks in data communication with the sequencer block are representative and a communication subsystem that provides the command data to a controlled system that is external to the code blocks.

22 Claims, 8 Drawing Sheets

(56) References Cited

OTHER PUBLICATIONS

"Blinky Blocks—Claytronics," [online][Retrieved on Apr. 3, 2014]; Retrieved from the Internet URL: http://www.cs.cmu.edu/~claytronics/hardware/blinkyblocks.html, 1 page.
"Blockly—A visual programming editor," [online][Retrieved on Apr. 3, 2014]; Retrieved from the Internet URL: https://code.google.com/p/blockly/, 2 pages.
"Create stories, games, and animations Share with others around the world," [online][Retrieved on Apr. 3, 2014]; Retrieved from the Internet URL: http://scratch.mit.edu/, 2 pages.
"Ludos—Ludos: Program With Your Hands for Children to Learn Coding Skills—Digital Dream Labs," [online] [Retrieved on Apr. 3, 2014]; Retrieved from the Internet URL: http://www.digitaldreamlabs.com/ludos/, 5 pages.
"My learning memories—Dr Wagon—A revolutionary tangible programming interface," [online][Retrieved on Apr. 3, 2014]; Retrieved from the Internet URL: http://alfredosandes.tumblr.com/post/49060337074/dr-wagon-a-revolutionary-tangible-programming, 5 pages.
"Primo makes programming tangible, helping kids write their first programs and algorithms"—Wired [online][Retrieved on Apr. 3, 2014]; Retrieved from the Internet URL: http://primo.io/, 5 pages.
"Tangible Programming Bricks, An approach to making programming accessible to everyone," [online][Retrieved on Apr. 3, 2014]; Retrieved from the Internet URL: http://xenia.media.mit.edu/~mcnerney/tangible-programming.html, 1 page.
Bers et al., "Running head: Tangible Programming in Early Childhood," Tufts University, 32 pages.
Gallardo et al., "TurTan: a Tangible Programming Language for Creative Exploration," Universitat Pompeu Fabra Ocata 1, 08003 Barcelona, 4 pages.
Horn et al., "Tangible Programming and Informal Science Learning: Making TUIs Work for Museums," Tufts University, 8 pages.
Horn et al., "Tangible Programming in the Classroom with Quetzal," [online][Retrieved on Apr. 3, 2014]; Retrieved from the Internet URL: http://www.eecs.tufts.edu/~mhorn01/quetzal/, 2 pages.
Horn et al., "Tern—Tangible Programming," [online][Retrieved on Apr. 3, 2014]; Retrieved from the Internet URL: http://hci.cs.tufts.edu/tern/, 3 pages.
McNerney, "Tangible Programming Bricks: An approach to making programming accessible to everyone," MIT Thesis 1999, 86 pages.
Smith, "Using Magnets in Physical Blocks That Behave As Programming Objects," ACM, 2007, 5 pages.
Suzuki et al., "Interaction-Level Support for Collaborative Learning: AlgoBlock—An Open Programming Language," CSCL Proceedings, 1995, 7 pages.
Terry, "Task Blocks: Tangible Interfaces for Creative Exploration," 2 pages.

* cited by examiner

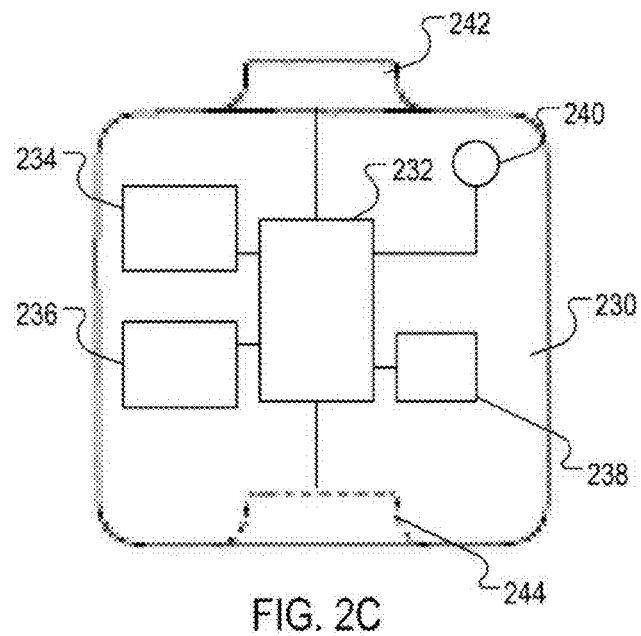
FIG. 2C
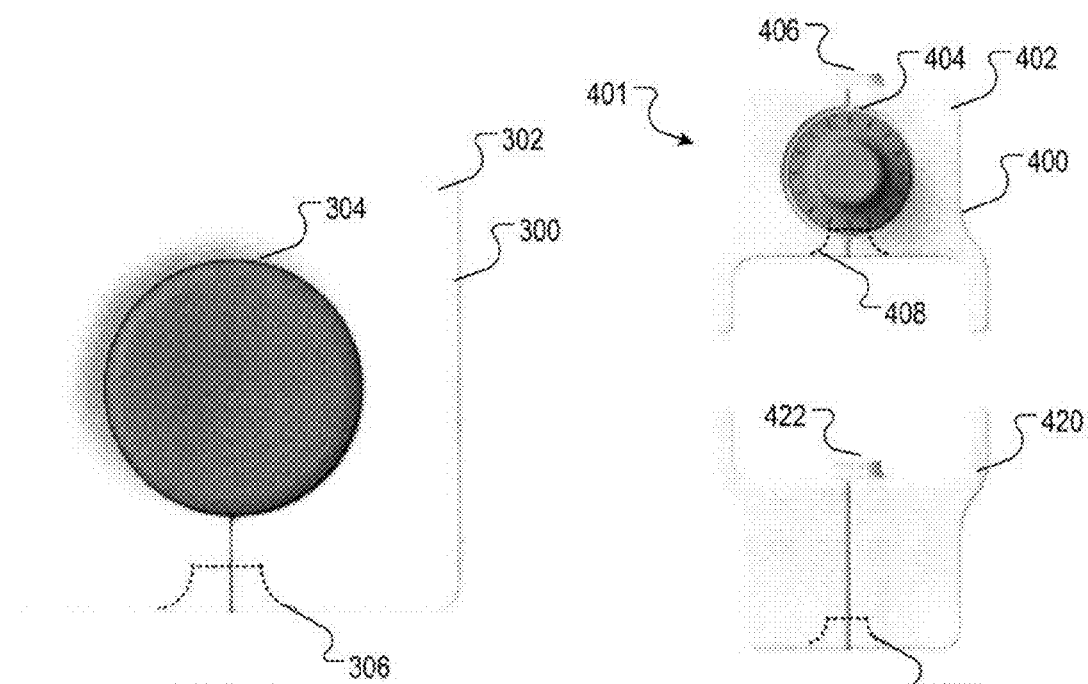
FIG. 3
FIG. 4

PHYSICAL CODING BLOCKS

CROSS-REFERENCE TO RELATED APPLICATIONS

This application claims the benefit under 35 U.S.C. § 119(e) of U.S. Patent Application No. 61/978,373, entitled "PHYSICAL CODING BLOCKS," filed Apr. 11, 2014, which is incorporated herein by reference in its entirety.

BACKGROUND

Computer programming for many current technical disciplines is an essential skill. Furthermore, basic programming concepts are also important skills for many non-technical disciplines. For example, many software applications, services, and devices are capable of performing automated tasks defined by a sequence of rules or commands.

Whether a person is programming in a sophisticated programming language or utilizing a simplified set of pseudo-code rules to realize a logic flow, the person needs a foundational understanding of fundamental programming concepts. Such programming concepts include an understanding of actions, conditional statements, loops, jumps, arguments, etc.

Children are especially receptive to learning new concepts. However, computer code, by its very nature, is an intangible and complex subject that requires a high time investment to learn, and has a very steep learning curve. Furthermore, children often require additional mentoring when learning more complex concepts than would an adolescent or an adult.

SUMMARY

This specification describes technologies relating to physical abstractions of programming code concepts, and a controlled system that can be controlled by the sequence of the physical abstractions.

In general, one innovative aspect of the subject matter described in this specification can be embodied in a system that includes a plurality of code blocks, each code block including at least one connector, each connector configured to mate with a corresponding connector of another coding block and connect the coding blocks in data communication and coding circuitry that generates coding data representative of instruction code to which the coding block corresponds; wherein the code blocks, when connected by their connectors in a sequence, are representative of a control flow, and the code blocks include a sequencer block that receives from code blocks in data communication with the sequencer block the coding data of the code blocks, and wherein: the coding circuitry of the sequencer block generates from the received coding data a sequence of commands that corresponds to a control flow of which the code blocks in data communication with the sequencer block are representative, and the sequencer block includes a communication subsystem that provides the sequence of commands to a controlled system that is external to the code blocks, wherein the controlled system performs the sequence of commands. Other embodiments of this aspect include corresponding apparatus and computer programs.

In general, another aspect of the subject matter described in this specification can be embodied in methods that include the actions of receiving, at a sequencer block in data communication with a sequence of code blocks that are connected in a sequence that is representative of a control flow, coding data from each of the code blocks, the coding data for each block representative of an instruction code to which the block corresponds; generating, from the coding data, a sequence of commands that corresponds to the control flow of which the code blocks in data communication with the sequencer block are representative; and providing the sequence of commands to a controlled system that is external to the sequencer block and the code blocks, wherein the controlled system performs the sequence of commands. Other embodiments of this aspect include corresponding systems, apparatus, and computer programs, configured to perform the actions of the methods, encoded on computer storage devices.

In general, another aspect of the subject matter described in this specification can be embodied in a system that includes a sequencer block, that includes a first connector configured to mate with a corresponding connector of a coding block connected in a sequence of coding blocks representative of a control flow and establish data communication with the sequence of coding blocks; coding circuitry that receives coding data from the sequence of coding blocks coding data, the coding data representative of instruction code to which the coding blocks corresponds, and generates from the received coding data command data that is representative of a sequence of commands that corresponds to a control flow of which the code blocks in data communication with the sequencer block are representative; and a communication subsystem that provides the command data to a controlled system that is external to the code blocks. Other embodiments of this aspect include corresponding apparatus and computer programs.

Particular embodiments of the subject matter described in this specification can be implemented so as to realize one or more of the following advantages. The coding blocks are especially suited for children, allowing them to create physical manifestations of control logic flows. This allows children to better understand complex logic flows at a very young age, and establishes a foundational understanding of coding concepts through an intuitive and entertaining experience. Furthermore, because the coding blocks are configured to be connected in sequences, rigid rules relating to syntax or particular languages can be ignored, which reduces the learning curve and, in turn, reduces frustration the children may otherwise experience. Accordingly, children are free to build and test various logic control flows with little to no supervision.

These features greatly simplify the learning of computer coding concepts and logic for children, and allows for the children to learn these basic concepts unaided. Furthermore, the controlled system provides the children with immediate, interactive feedback from which they can build upon foundational concepts. The system is language independent, as the concepts that are taught are applicable to all programming languages. The system enables faster understanding and comprehension of a very complicated set of principles through a concrete and playful activity. In addition to being universal in terms of programming language, the system is also universal in terms of spoken language; programming elements can be expressed in terms of written symbols, and the code blocks are further abstracted to work in with any language. Furthermore, a child does not need to be able to read and write to engage with the system, and thus fundamental programming concepts can be learned at a very early age.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2C are block diagrams of various components of code blocks that facilitate interconnection of the blocks and generation of a command sequence.

FIG. 3 is a diagram of a sequencer block.
FIG. 4 is a diagram of a repeat block set.

Like reference numbers and designations in the various drawings indicate like elements.

DETAILED DESCRIPTION

Overview

The system described in this written description realizes the physical abstraction of programming concepts into physical form. An example implementation is in the form of a modular controller based on a set of interactive code blocks. The code blocks can be assembled and configured in different ways to represent control flows. Once together and activated, the sequence of code blocks is used to generate a sequence of commands that corresponds to the control flow, and the sequence of commands are used to control a controlled system that is external to the code block.

The code blocks include circuitry and communication subsystems. The circuitry generates coding data representative of instruction code to which the coding block corresponds, and the communication subsystem allows the blocks to communicate with a sequencer block. The sequencer block communicates with a controlled system, e.g., a tablet game, a robotic device, etc., and provides the sequence of commands to the controlled system. The controlled system then executes the commands, resulting in visual feedback for the user. For example, a user may "program" a robot to move in a predefined pattern by connecting a series of move blocks in a sequence; or the user may "program" a character in a game to take a predefined series of actions, some of which may be conditional.

In some implementations, the control blocks may include a sequencer block, sets of logic blocks, action blocks, and data blocks, all of which may be interconnected in a sequence. Each action block is representative of an action that is to be performed in a code sequence; each set of logic code blocks is representative of a logic flow control in a code sequence; and each data block corresponds to a data value. The sequencer block communicates with the logic, action and data blocks to generate a sequence of commands that corresponds to a control flow that is represented by the sequence in which the logic, action and data blocks are interconnected.

In some implementations, the sequencer block includes a wireless communication subsystem that communicates with a controlled system. The software enables the controlled device to establish a communication channel with the sequencer block, receive the sequence of commands, and execute different actions based on those commands. The sequence of commands can be executed sequentially, repeatedly, and even conditionally.

In some implementations, the controlled device can provide signals to the sequencer block to provide additional user feedback through a series of light emitting diodes (LEDs) installed on each block.

These features and additional features are described in more detail below.

Example Physical Coding Block System

Figure 1:
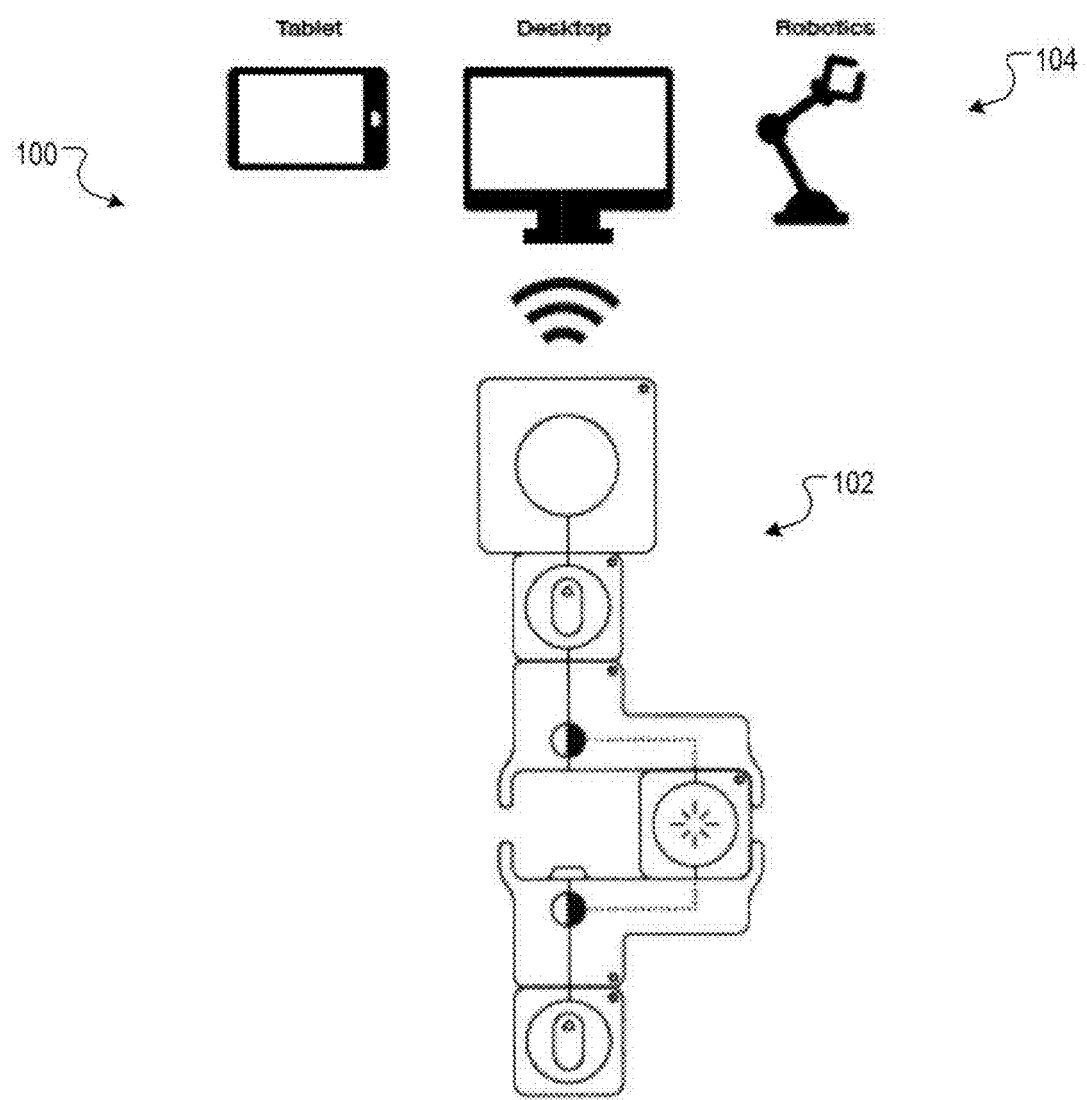
FIG. 1 is a block diagram of a physical coding block system.

FIG. 1 is a block diagram of a physical coding block system 100. The system includes coding blocks 102 arranged in a sequence, and one or more controlled systems 104. Each block corresponds to an instruction code. As will become apparent, the sequence of blocks 102 represent the following control flow:

Run {
  Move(up);
  If (black) {
    Perform.task(Assigned.task)
  }
  Move(up);
}

For example, in the context of a computer game on a tablet, execution of the control flow will cause a character on the computer game to move in an upward direction. Then, if the character encounters a "black" condition, e.g., a control component on the screen in a "black" state, the character performs an assigned task. To illustrate, if the "black" state is a locked door, the assigned task may be an "unlock door" task that causes the character to unlock a door. After the character performs the task, i.e., unlocks the door, the character then moves upward again, e.g., through a now open doorway. However, had the door been in a "white" state, e.g., unlocked, the character would not unlock the door and instead move through the doorway.

Interconnection of the code blocks is facilitated by connectors, and the code blocks, when connected by their connectors in a sequence, are representative of a control flow defined by the instruction codes to which the blocks correspond. Generation of data from which the sequence of commands is generated is facilitated by circuitry within the code blocks. For example, in some implementations, each block contains circuitry that encodes a command associated with it and those commands are compiled in a sequencer block 302 where the sequence is generated. These features, alternate features, and additional features are described in more detail below.

Figure 2A:
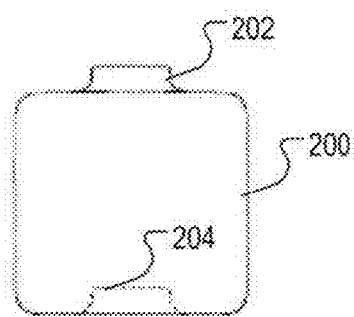
Figure 2B:
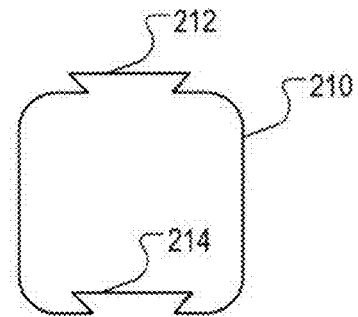

FIGS. 2A-2C are block diagrams of various components of code blocks that facilitate interconnection of the blocks and generation of a command sequence. FIGS. 2A and 2B illustrate example connectors that can be used to connect code blocks in sequence. FIG. 2A shows a code block 200 with a male connector 202 and a counterpart female connector 204. Each connector may be configured to friction fit with a counterpart connector, and/or may be assisted by other connection devices, such as peripheral magnets or clips.

FIG. 2B illustrates a code block 210 with slidable interlocking connectors 212 and 214. Each connector may friction fit with a counterpart connector, and/or may be assisted by other connection devices, such as peripheral magnets, detents, etc.

Each connector 202 and 204 or 212 and 214 includes a set of contacts, such as metal pins and receptacles or metal mating surfaces, that facilitate data communication between connected code block. The connections and communication protocol used in the code block may further facilitate a single communication channel though each of the code blocks connected in sequence, e.g., a serial communication bus.

FIG. 2C is a block diagram of a code block and components that may be used in each code block. As will be described in more detail below, a code block may include all of the components of FIG. 2C, or fewer components, depending on its functionality. The example components include coding circuitry 232, an input device 234, a communication subsystem 236, a power subsystem 238, and one or more indicators 240.

As will be described below, the coding circuitry 232 of a code block may be programmed to generate command sequences, data values, and the like, depending on the functional of the code block 230. The input device 234 may be a sensor, an actuator, a selector, or some other device by which data may be input into the code block 230. The type of sensor 234 used, if any, depends on the function of the code block. The communication subsystem 236 is a wireless communication system that communicates with a controlled device over one of any appropriate wireless protocols. Each code block can include a communication subsystem 234; however, in some implementations, only the sequencer includes the communication subsystem 234, and communication among other control blocks is carried out by a serial communication protocol over the connectors 242 and 244.

The power subsystem 238 provides power to the code block 230. A variety of appropriate DC power systems can be used. Each code block can include its own power subsystem 238. However, in some implementations, only the sequencer block includes the power subsystem 238, and power to other code blocks is provided from the sequencer block over the connectors 242 and 244.

One or more indicators 240 may be included. The indicators may provide visual and, optionally, aural feedback to a user. Other types of sensory feedback can also be implemented, such as vibration. For example, the indicator 240 may be a multi-color LED that indicates various states by means of color and flash patterns. Example states and their indications are listed in table 1 below.

TABLE 1

| State | LED Indicator |
| --- | --- |
| Connected | Solid White |
| Adjusting | Bright Blue Pulse |
| Compiling | White Wave |
| Running - Active | Solid Bright Blue |
| Running - Inactive | Solid Dim Blue |
| Incomplete | Solid Bright Amber |
| Error | Solid Bright Red |

The state may correspond to a single code block, or an entire sequence. Examples of states and LED indicators are described in more detail below.

Examples of code blocks are described with reference to FIGS. 3-12 below, and example configurations of code block sequences are described with reference to FIGS. 13-16 below.

Sequencer Block

One type of code block is a sequencer block, a diagram of which is shown in FIG. 3. The sequencer block 300 includes an indicator 302, an actuator 304, e.g., a button, and a connector 306. Additionally, the sequencer block 300 includes coding circuitry 232, a communication subsystem 236, and a power subsystem 238. The sequencer block 300 connects to a sequence of code blocks, and when the actuator 304 is actuated, the sequencer "compiles" the sequence of connected code blocks and generates a sequence of commands. The sequence of commands is then sent to the controlled device by the communication subsystem 236.

In operation, the sequencer block 300 receives from other code blocks in data communication with the sequencer block 300 the coding data generated by the respective circuitry of the coding blocks. The coding circuitry of the sequencer block 300 then generates from the received coding data a sequence of commands that corresponds to a control flow of which the code blocks in data communication with the sequencer block are representative.

For example, with reference to FIG. 1, the sequencer block 300 would receive coding data from the sequence of the five blocks connected to the sequencer block 300, and from this data, determine the sequence of the blocks and generate the following sequence of commands:

```
Run {
  Move(up);
  If (black) {
     Perform.task(Assigned.task)
  }
  Move(up);
}
```

The coding data that is provided to the sequencer block 300 from each connected block may vary according to how the sequencer block 300 constructs the sequence of commands. Furthermore, in some implementations, the sequencer block 300 need not implement a sequencing algorithm to generate the complete sequence of commands; instead, it may provide the coding data to a controlled device that then interprets the coding data to generate the sequence of commands using the sequencing algorithm. Examples of how the sequencer block 300 processes the coding data are described with reference to FIG. 20 below.

Logic Blocks

Figure 5:
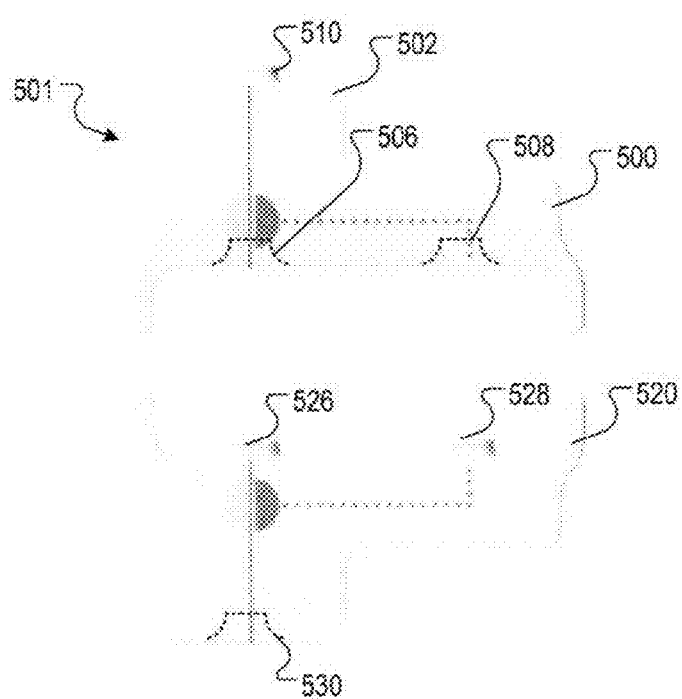
FIG. 5 is a diagram of a branch block set.
Figure 6:
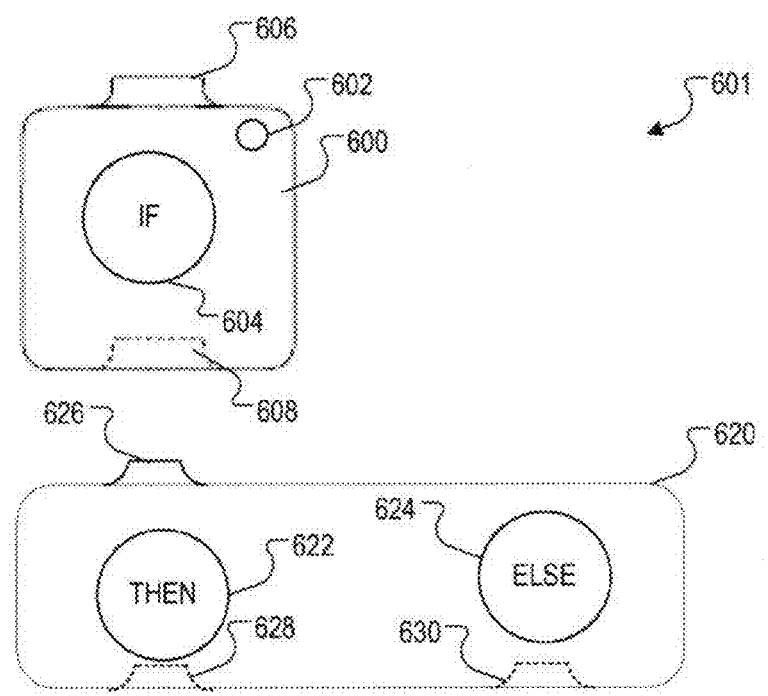
FIG. 6 is a diagram of an if-then-else block set.

Another type of code block is the logic block. Logic blocks represent conditional flow control. Because logic blocks often may have multiple flow control branches and define start and end points, the logic blocks are often implemented in sets of two (or more) code blocks. However, logic blocks may also be implemented as single blocks. Example logic block sets include repeat block sets, branch block sets, and if-then-else block sets, diagrams of which are shown in FIGS. 4, 5 and 6, respectively.

FIG. 4 is a diagram of a repeat block set 401. The repeat block set 401 includes a first block 400 and a second block 420. The first block 400 includes an LED 402 and a count selector 404. The count selector 404 is operable to specify a count number. In the example shown in FIG. 4, the count selector 404 is a dial, but other count selector inputs can also be used. A sequence of blocks is connected between the first block 400 and the second block 420 by connectors 408 and 422. The coding circuitry of first block 400 and second block 420 are operatively associated so that a sequence of commands generated from the sequence code blocks connected between the connectors 408 and 422 is performed a number of times that is equal to the count number specified by the count selector 404.

The repeat block set 401 is the representation of the concept of repetition and is thus able to repeat a series of commands a specified number of times. The sequence of commands generated from the coding data of the repeat block set 401 may be of the form:

for (i=0; i<count; i++) {
// commands from sequence code blocks executes
}

The repeat block set 401 can be connected to other sequences of blocks by connectors 406 and 424. However, sequences of blocks that are connected to the connectors 406 and 424 are not controlled by the repeat block set 401, as the repeat block set 402 only controls the sequence of blocks connected between connectors 408 and 422.

FIG. 5 is a diagram of a branch block set 501. The branch block set 501 includes a first block 500 and a second block 520. The first block 500 includes parallel first connectors 506 and 508. One of the parallel first connectors corresponds to a first condition, and the other of the parallel first connectors corresponds to a second condition that is exclusive of the first condition. For example, the parallel connector 506 corresponds to the condition "white," and the parallel connector corresponds to the condition "black." The second block 520 includes parallel second connectors 526 and 528. The parallel second connector 526 corresponds to parallel first connector 506, and the parallel second connector 508 corresponds to the parallel first connector 528.

One sequence of blocks may be connected between the connectors 506 and 526, and another sequence of blocks may be connected between connectors 508 and 528. The coding circuitry of the first block 500 and the coding circuit of the second block 520 are operatively associated so that either a first sequence of commands generated from a first sequence code blocks connected to the connectors 506 and 526 or a second sequence of commands generated from a second sequence of code blocks connected the connectors 508 and 528 is performed according to the occurrence of the first condition "white" or the second condition "black."

While two sequences of blocks can be connected in parallel between the connector pairs 506, 526 and 508, 528, only one sequence need be connected for the branch block set 501 to be operable. For example, if a sequence of blocks is only connected between the connector pairs 506, 526, which correspond to the "white" condition, and the "black" condition occurs, then no operation results from the branch block set 501. Instead, flow control will go from the sequence of blocks connected to the connector 510 to the next sequence of blocks connected to the connector 530.

The sequence of commands generated from the coding data of the branch block set 501 may be of the form:

if (white) then {
// commands from white sequence code blocks executes
} else if (black) then {
// commands from black sequence code blocks executes
}

FIG. 6 is a diagram of an if-then-else block set 601. The block set 601 includes a first block 600 and a second block 620. The first block 600 includes an "IF" indicator 604, and the second block includes a "THEN" indicator 622 and an "ELSE" indicator 624. The control circuitry of the blocks 600 and 620 are operatively associated to define a test of whether a sequence of blocks connected between the connectors 608 and 626 define a true statement. For example, a temperature sensor block 700 may be connected to an operator block 900, and the operator block 900 may be connected to a value block 800. The operator block 900 may be set to the "greater than" operand, and the value block may be set to 20 degrees Celsius. When the temperature reading is greater than 20 degrees, the sequence of blocks connected between the connectors 608 and 626 define a true statement; otherwise, the sequence of blocks connected between the connectors 608 and 626 define a false statement.

When the sequence of blocks connected between the connectors 608 and 626 define a true statement, then a sequence of commands from a sequence of blocks connected to the connector 628 will be processed; otherwise, a sequence of commands from a sequence of blocks connected to the connector 630 will be processed.

The if-then-else block set 601 may include another block set that joins the two sequences connected to the connectors 628 and 638 if flow control is to resume along a same path. For example, the block 520 could be used to close a branch defined by the "THEN" and "ELSE" statements. However, a logic flow control in a code sequence may properly terminate without joining the two sequences connected to the connectors 628 and 638, e.g., the logic flow may terminate after execution of either the "THEN" or "ELSE" sequences.

The sequence of commands generated from the coding data of the if-then-else block set 601 may be of the form:

if (commands from IF sequence=.TRUE.) then {
// commands from THEN sequence code blocks executes
} else {
// commands from ELSE sequence code blocks executes
}

The three logic block sets above are not exhaustive, and other logic functions can be implemented in sets of one or more logic blocks. For example, logic block sets can be made for CASE type logic, JUMP logic, etc. Furthermore, logic blocks can be implemented as a single block. For example, a single branch logic block can be used if a control flow is not designed to resume along a same control path. By way of another example, a JUMP logic block may have a dial that selects a number, and if a condition is true, such as "WHITE," then the instructions corresponding to the selected number of blocks may be skipped. An example command sequence may be:

if (white) then {
jump(count);
}

Data Blocks

Another type of code block is a data block. Each data block corresponds to one of different data types. For example, data types may be sensors, operand values, etc. The coding circuitry of each data block is configured to generate a data value of a data type to which the data block corresponds.

Figure 7:
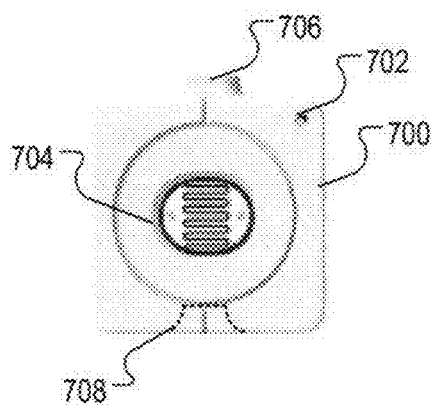
FIG. 7 is a diagram of a sensor block.

FIG. 7 is a diagram of a sensor block 700. The sensor block 700 includes a sensor 704. A variety of sensors can be used, including photo sensors, audio sensors, pressure sensors, and temperature sensors. For example, assume the code block 700 is a temperature data block, and the sensor 704 is a temperature sensor. The coding circuitry of the temperature block thus generates a temperature value that corresponds to a temperature sensed by the temperature sensor 704, e.g., "value.temperature (21)."

Figure 8:
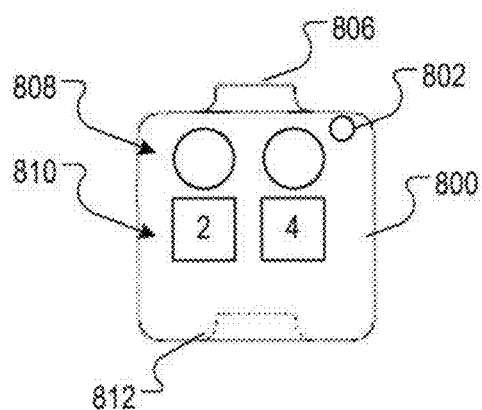
FIG. 8 is a diagram of a value block.

FIG. 8 is a diagram of a value block 800. The value block 800 includes a number selector 808 that is operable to specify one of a plurality of numbers in a range. The number is indicated by a number value 810. In the example shown, the selector 808 is a pair of buttons, each of which, when pressed, increments a corresponding value in a range from 0-9. The coding circuitry of the numeric value block 800 generates a number value that corresponds to the number selected by the number selector 808. For example, the number value generated for the value block 800 would be 24, e.g., "value.number(24)."

Figure 9:
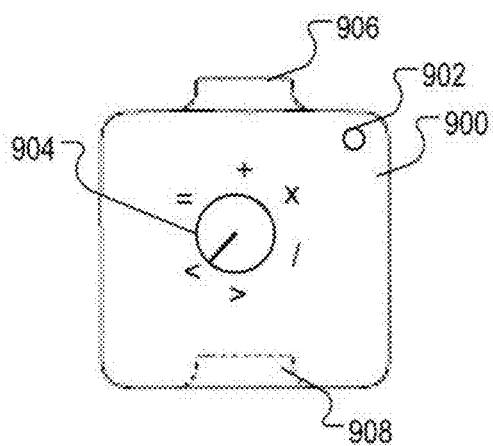
FIG. 9 is a diagram of an operator block.

FIG. 9 is a diagram of an operator block 900. The operator block 900 includes an operator selector 904 that can select from a variety of operators. The coding circuitry of the operator block 900 generates a coding data representative of the operator. The operator block 900 can be used to multiply values, e.g., to multiply the value from a data block connected to the connector 906 by another data value from a data block connected to the connector 908. Likewise, the operator block 900 can be used to specify a conditional test, such as the temperature test as described above.

The three value blocks above are not exhaustive, and other value types can be implemented by corresponding value blocks.

Action Blocks

Action blocks are another type of code block, and are representative of actions to be performed by a controlled device. Examples of action blocks are shown in FIGS. 10-12.

Figure 10:
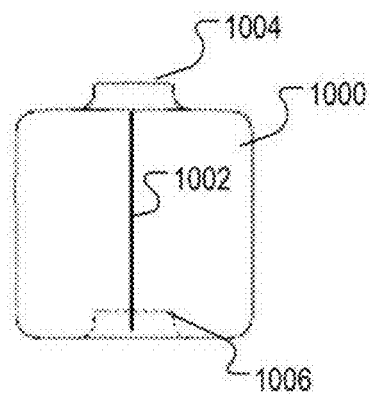
FIG. 10 is a diagram of a spacer block.

FIG. 10 is a diagram of a spacer block 1000. A spacer block 1000 is a block that performs no action, and provides a pass through by means of a connection 1002 between the connectors 1004 and 1006. The spacer block 1000 can be used to ensure that two sequences of blocks in a logic block set are of the same cardinality. For example, in the branch block set 501, the "white" sequence may define three operations by use of three action blocks, and the "black" sequence may define two operations by use of two action blocks. In such a situation, the "black" sequence will include a spacer block so that the first block 500 and the second block 520 may both connect to the two respective sequences.

Figure 11:
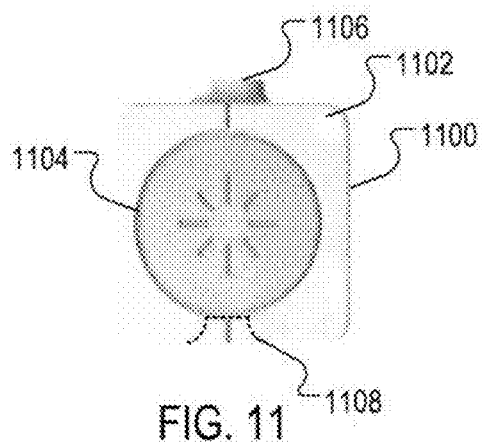
FIG. 11 is a diagram of a programmable task block.
Figure 12:
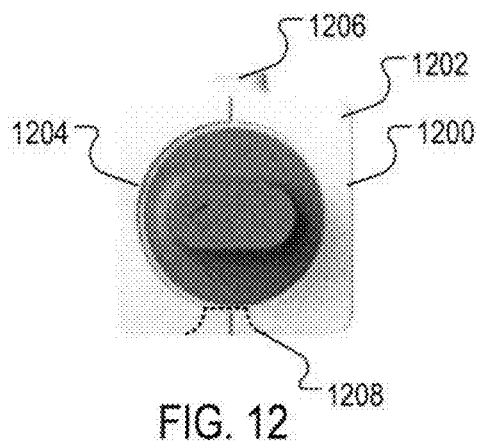
FIG. 12 is a diagram of a move block.
Figure 13:
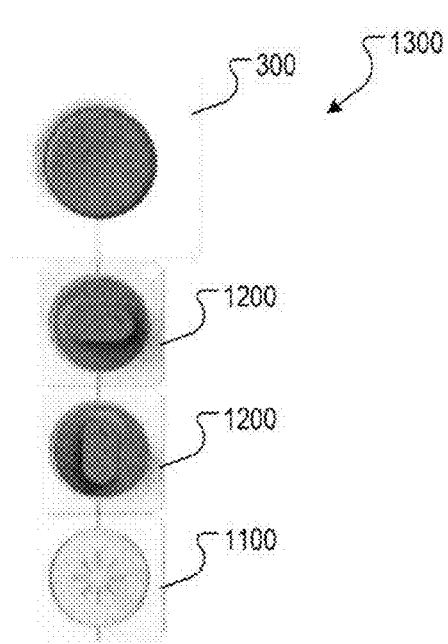
FIGS. 13-16 are diagrams of code block sequences.
Figure 14:
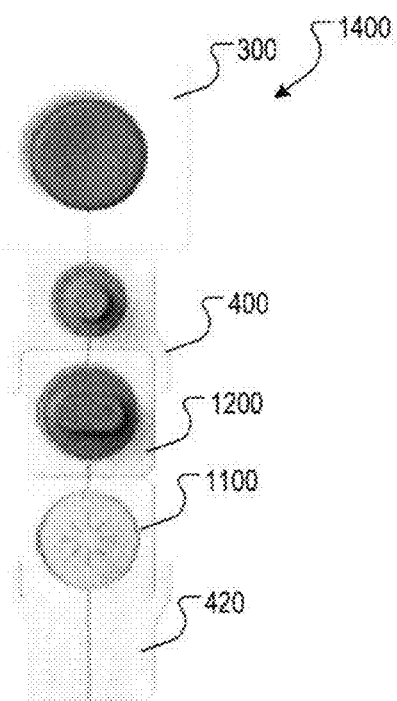
Figure 15:
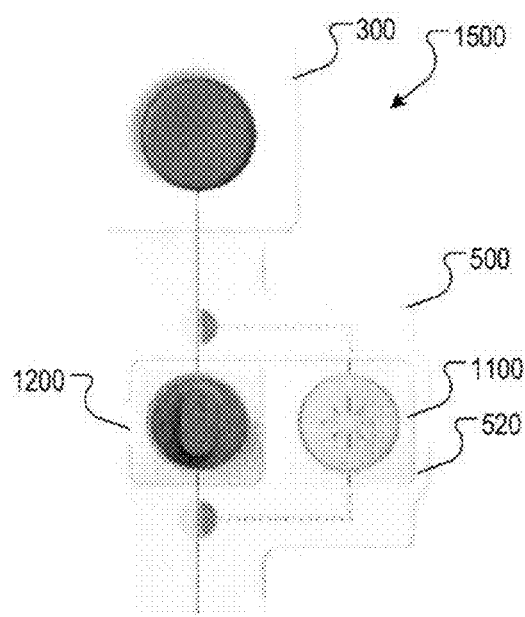
Figure 16:
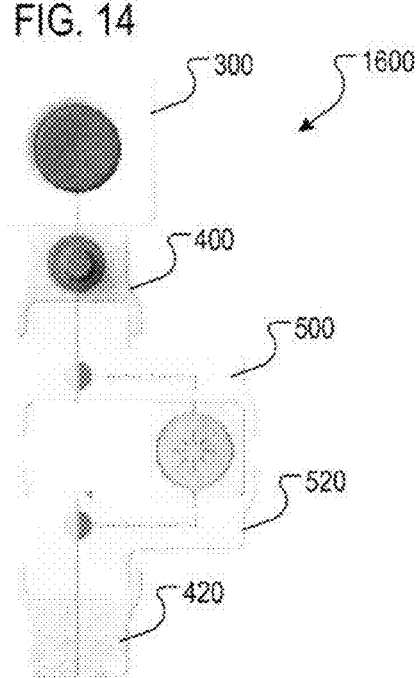

FIG. 11 is a diagram of a programmable task block 1100. The task block 1100 includes a task symbol 1104. The programmable task block 1100 is configured to be associated with one of several tasks that are to be performed in a code sequence. The coding circuitry of the programmable task 1100 block generates a task command that specifies the associated task to be performed.

A task can be assigned to the task block 1100 by the controlled device, or by some other device that communicates with the task block 1100. For example, a tablet may be used as a user interface to assign tasks to the task block 1100, where the tasks are to be performed by a robot. Example tasks for the robot may include flashing a light, or making a sound, moving an element, such as an arm, etc. In a similar manner, the tablet may be used as a user interface to assign tasks to the task block 1100, where the tasks are to be performed by a character in a game played on the user interface. Examples of such assignments are described with reference to FIGS. 17-19 below.

The sequence of commands generated from the coding data of the task block 1100 may be of the form:
Perform.task(Assigned.task)

In some implementations, the task symbol 1104 is not interactive, and the task block 1100 performs the task automatically. In other implementations, the task symbol 1104 functions as a button input, and the task block 1100 performs the task only when the task symbol 1104 is pressed. For example, as the controlled device executes a sequence of commands, the controlled device sends a status of execution to the sequencer block 300. The sequencer block 300, in turn, sends signals to the connected code blocks so that each connected code block indicates the respective status of the performance of its corresponding instruction by the controlled device, e.g., completed, waiting, active, etc. Before the task of the task block 1100 is performed, the LED 1102 may be solid dim blue; when the task is ready to be performed, however, the LED 1102 of the task block 1100 may flash bright green, indicating that the controlled device has executed the coding sequence up to the point represented by the task block 1100, and the controlled device is awaiting user input to confirm performance of the assigned task.

FIG. 12 is a diagram of a move block 1200. The move block 1200 includes a move selector 1204 that is operable to select one of several movement directions. The coding circuitry of the move block 1200 generates a move command that specifies the movement direction. For example, assume the move selector 1204 has four positions—left, right, up, and down. The four possible sequences of commands generated from the coding data of the task block move block may be of the form:
Move(left);
Move(right);
Move(up);
Move(down);

The two action blocks above are not exhaustive, and other action blocks can also be implemented. For example, a "Wait" block can be used to specify a waiting period to pause a code sequence until an actuator is pressed. To illustrate, a code sequence generated from a sequence of code blocks may specify that a robot move right, then pause until the user presses a button on the "wait" block, and then move left again. As the sequence of commands is executed, the robot communicates it status to the sequence of code blocks. When the robot is paused, the robot sends a signal to the code sequencer block indicating the robot is waiting, and the sequencer block, in turn, sends a signal to the wait block that causes an LED on the wait block to flash bright green, which indicates a user input is required for the robot to resume movement.

Example Code Block Sequences

FIGS. 13-16 are diagrams of code block sequences 1300, 1400, 1500 and 1600. As described above, when the sequencer block 300 is activated, it receives the coding data from the sequence of code blocks connected to it and generates a sequence of commands that corresponds to a control flow represented by the connected sequence of blocks.

For example, the sequence 1300 represents two moves followed by a task. The corresponding sequence of commands is:
Run {
Move(right);
Move(up);
Perform.task(Assigned.task);
}

The sequence 1400 represents executing two commands repeatedly. The corresponding sequence of commands is:
Run {
Repeat(Count) {
Move(right);
Peform.task (Assigned.task);
}
}

The sequence 1500 represents a branch to execute one of two commands. The corresponding sequence of commands is:

```
Run {
  If (white) then {
    Move(up);
  } if else (black) then {
    Perfom.task(Assigned.task);
  }
}
```

The sequence 1600 represents the repetition of branch. The corresponding sequence of commands is:

```
Run {
  Repeat(Count) {
    If (white) then {
      No_Op;
    } if else (black) then {
      Perfom.task(Assigned.task);
    }
  }
}
```

As described above, when a sequence of commands is being performed by a controlled device, the controlled device can communicate with the sequencer block 300 and report an execution status. The sequencer block 300 can then generate control signals to indicate the execution status on the sequence of code blocks. For example, for the sequence 1400, the LED in the code block 400 may be solid bright blue while the command sequence corresponding to the code blocks 1200 and 1100 are being performed. During this time, the LEDs for the code blocks 1200 and 1100 may change in accordance with the controlled device moving right or performing the assigned task.

When generating the sequence of commands from the coding data received from a sequence of code blocks, the sequencer block 300 may perform error checking to ensure that the sequence of commands forms a complete logic flow. For example, with reference to FIG. 14, assume that a user did not attach the block 420, and pressed the actuator 304 of the sequencer block 300. The sequencer block 300 would determine, from the received coding data, that the repeat loop started by the block 400 does not have a definite end due to the absence of the second block 420. In response, the sequencer block 300 would generate a signal to cause one or more LEDs to flash. For example, the sequencer block 300 would cause the LED on the block 400 to flash bright amber, indicating the repeat loop is incomplete.

The sequencer block 300 may also perform error checking to ensure that the sequence of commands meet type requirements. For example, assume a value block 800 is connected to the input of an operator block 900 with the "greater than" operator selected. A type requirement may be generated, specifying that the output of the value block 900 must be connected to another value block that generates a numeric value. Thus, if the value block 900 is connected to a move block 1200, which is of a "move" type, the sequencer block 300 will recognize the type match violation and cause the LED of the value block to flash bright amber.

Example Controlled System

Figure 17:
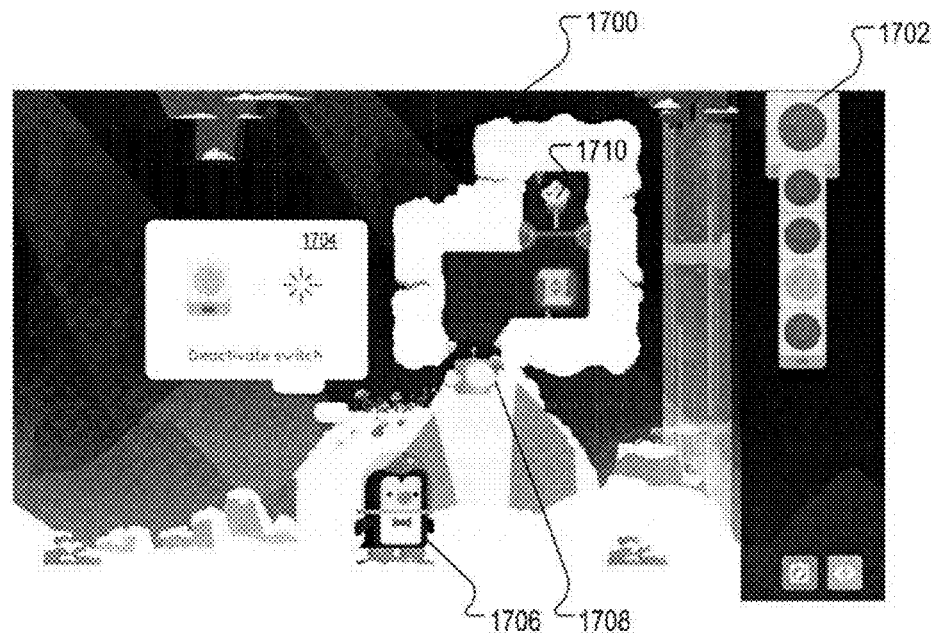
FIGS. 17-19 are illustrations of a controlled system game environment that utilizes physical block sequences to cause an on-screen element to perform a series of commands.
Figure 18:
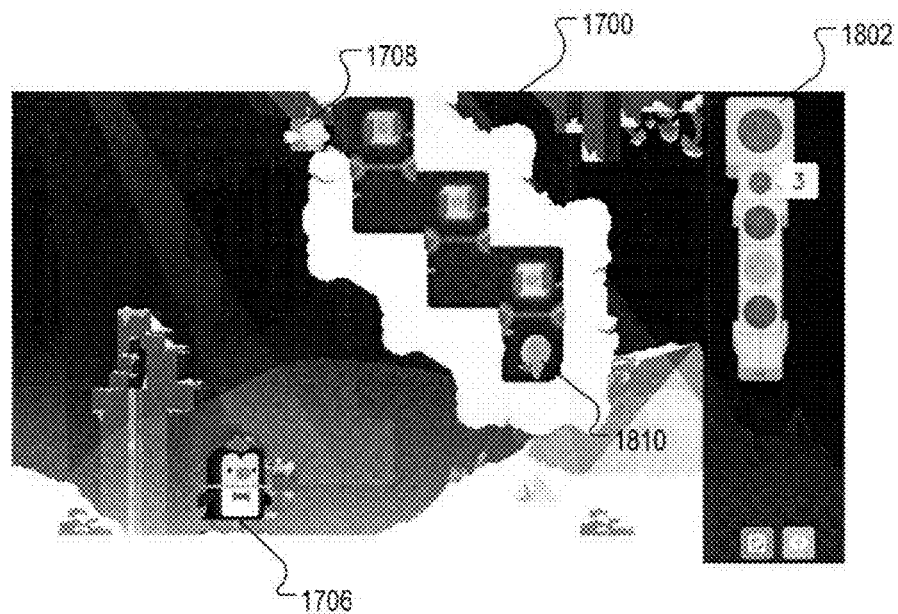
Figure 19:
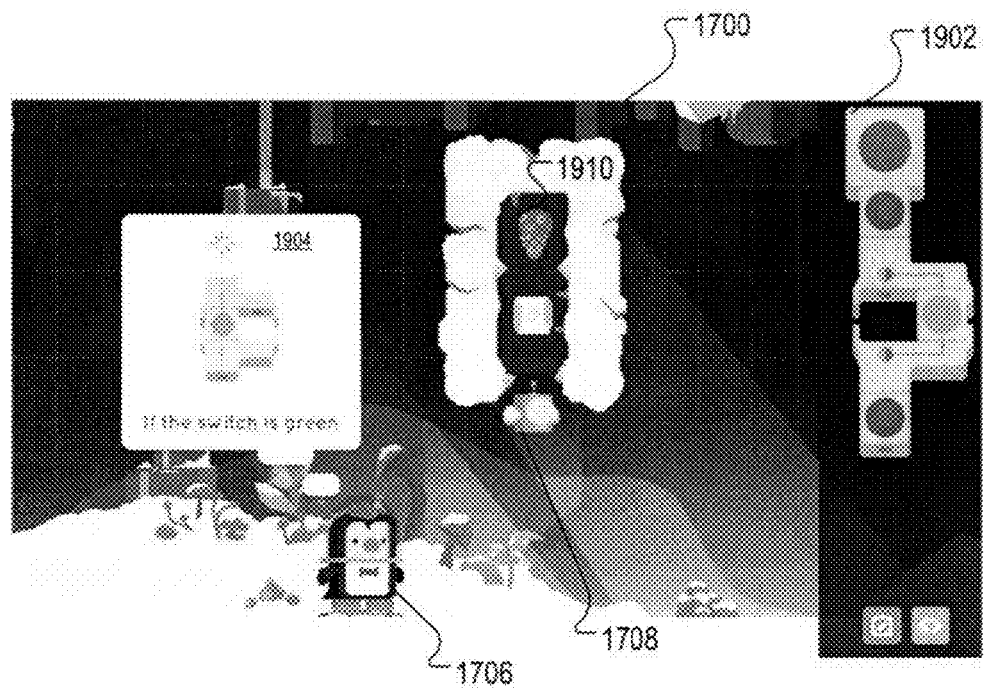

FIGS. 17-19 are illustrations of a controlled system game environment 1700 that utilizes physical block sequences to cause an on-screen element to perform a series of commands. The object of the game is to move a character 1708 ("Lulu") through a series of obstacles to obtain prizes 1710, 1810 and 1910. To guide Lulu to the prizes, the user must construct a series of code blocks that, when processed by the sequencer block 300, will generate a sequence of commands that successfully guides Lulu to the prizes.

Another character 1706 ("Hugo") provides the user with menus and instructions by means of pop-up dialogs 1704. In the environment shown, Lulu must not only move, but must take an action to deactivate a force shield that secures the prize 1710. To deactivate the force shield, Lulu must move to the green jewel and perform a "deactivate" command. The "deactivate" command can be assigned by interacting with the user interface dialog 1704. Here, only one task can be assigned. However, for a more complex scenario, multiple tasks may be shown and the user may select one of the multiple tasks for assignment to a task block.

In FIG. 17, the user has constructed a sequence of blocks that will cause Lulu to move up, then move right, then deactivate the force shield, and then move up to claim her prize 1710. In the user interface display 1700 on the controlled system, a graphical depiction 1702 of the sequence of code blocks that have been physically constructed by the user are displayed. The graphical depiction is generated by a software process running on the controlled device that interprets the received sequence of commands and derives the configuration of the physical blocks. The change the sequence, the user must manipulate the physical code blocks that are external to the controlled system.

In FIG. 18, the user has constructed a sequence of blocks more complex than the sequence constructed for FIG. 17, as Lulu's path to the prize 1810 is more complex and more actions are to be performed.

In FIG. 19, Hugo has provided a hint that the task of deactivating the switch should only be performed when the switch is green. Thus, thus user has constructed a branched logic flow that will allow Lulu to claim her prize 1910. When the force shield is active, Lulu will deactivate it before moving upward; however, when the force shield is not active, Lulu will move upward without taking any action.

Example Sequencer Block Process

Figure 20:
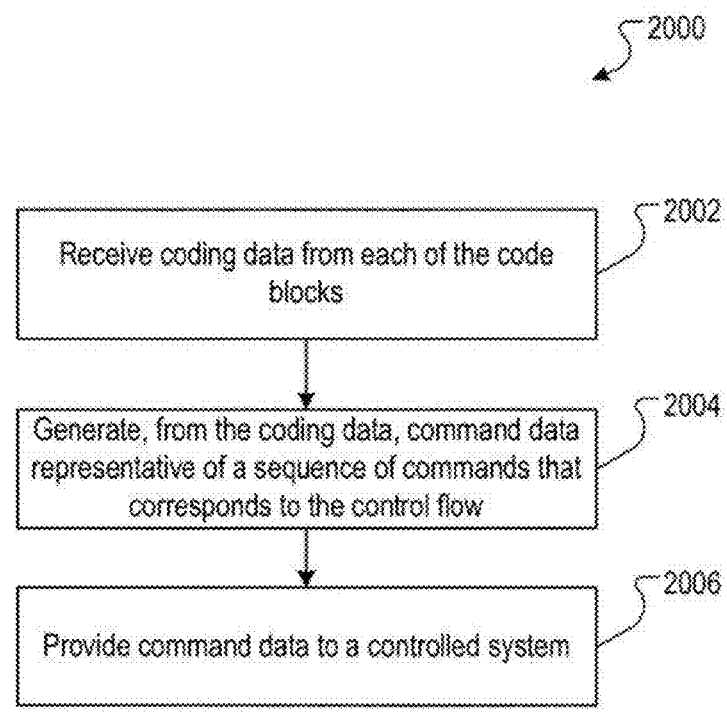
FIG. 20 is a flow diagram of an example process for generating a sequence of commands from a sequence of physical code blocks.

FIG. 20 is a flow diagram of an example process 2000 for generating a sequence of commands from a sequence of physical code blocks. The process 200 is performed by the sequencer block 300.

The sequencer block 300 receives coding data from each of the code blocks (302). For example, a sequence of coding blocks can be connected to a sequencer block 300, and each code block generates code data. The sequencer block 300 receives the coding data over a serial communication channel. In some implementations, the coding data can be received in a manner that is indicative of the connected sequence; e.g., each coding block may have a unique identifier and port numbers for each connector. The coding data may be tagged with the unique identifier, and may also include the port numbers of the code block, and for each port number, the port numbers of another code block to which the port is connected, and the identifier of the other code block.

In some implementations, the coding data specifies a type of block, e.g., each block function is specified by function value. For example, each move block may be specified by a first value in the coding data, a temperature sensor block may be specified by a second value in the coding data, etc. Additionally, the coding data may also provide any parameter values specified by a block. For example, a move block set to "Right" may provide coding data with the value of "Right," a temperature block may provide a temperature value in the coding data, and so on.

In other implementations, the coding data may be a complete command sequence for that particular block. For example, a move block set to the value of "Right" may provide "Move(right);" as coding data; a repeat logic block set may provide a repeat command sequence that includes the command sequences of the blocks it controls as coding data; and so on.

The sequencer block 300 generates, from the coding data, command data representative of a sequence of commands that corresponds to the control flow (304). For example, from the code data, the port numbers, and the identifiers, the sequencer block generates the sequence of commands that corresponds to a control flow represented by the connected sequence of blocks. During this process error checking as described above may be performed.

In implementations in which block type values and parameters are provided, the sequencer block 300 references data that describes the command sequence for each function type and generates the command sequences for the sequence of bocks based on the identifiers, parameters and the sequence of connections. In other implementations in which complete command sequences are provided for each block, the sequencer block 300 generates the command sequences for the sequence of bocks based on the sequence of connections.

The sequencer block 300 provides the sequence of commands to a controlled system (306). For example, assuming the sequence of commands constitutes a complete logic flow, e.g., no errors are detected, and the command data are the sequence of commands, the sequence of commands is provided to a controlled device, such as a tablet running a game controlled by the sequence of code blocks, or a robot controlled by the sequence of code blocks. Additional data, such as the unique identifiers and port number matches, may also be provided.

As described above, the sequencer block 300 need not generate a complete command sequence as the command data. For example, a controlled device may include a software process that generates a complete command sequence. In these implementations, the sequencer block 300 generates as the command data a mapping of the identifiers and values that specifies how the code blocks are sequenced together and any parameter values for each code block. The controlled device (or some other device in communication with the sequence block 300 and the controlled device) can then access data that specifies command sequences for each block type and generate the command sequence from the received command data.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a plurality of coded blocks comprising physical blocks that are physically configured to be connected to each other by connectors by a user to arrange a physical manifestation of a control flow, each coded block being a separate physical block that can be connected to one or more other of the coded blocks by a connector, and each coded block including:
   at least one connector, each connector configured to mate with a corresponding connector of another coded block and connect the coded blocks in data communication;
   coding circuitry that programs the coded block to generate coding data representative of instruction code which is modifiable depending on a function corresponding to the coded block;
   wherein:
   the plurality of coded blocks includes at least a sequencer block and one or more of data blocks and logic blocks connected by their connectors in a sequence, and when connected, the plurality of coded blocks are representative of the control flow; and
   at least one of each of the data blocks and logic blocks respectively include selectors that can be manipulated by a user to select one of two or more different values for the coded block;
   the sequencer block receives from coded blocks in data communication with the sequencer block the coding data of the coded blocks, and wherein:
   the coding circuitry of the sequencer block generates from the received coding data a sequence of commands that corresponds to the control flow of which the coded blocks in data communication with the sequencer block are representative, wherein the sequence of commands corresponding to the control flow is modifiable while the coded blocks are connected in the sequence and based on programming of the coded block and the values selected by use of the selectors of the coded blocks; and
   the sequencer block includes a communication subsystem that provides the sequence of commands to a controlled system that is external to the coded blocks, wherein the controlled system performs the sequence of commands.

2. The system of claim 1, wherein the coded block include:
   sets of logic blocks, each set of logic blocks including one or more coded blocks and representative of a logic flow control in a code sequence; and
   action blocks, each action block representative of an action that is to be performed in a code sequence.

3. The system of claim 2, wherein the coded blocks include data blocks, each data block corresponding to one of a plurality of data types, and the coding circuitry of each data block configured to generate a data value of a data type to which the data block corresponds.

4. The system of claim 3, wherein the data blocks include a temperature data block that includes a temperature sensor, and wherein the coding circuitry of the temperature block generates a temperature value that corresponds to a temperature sensed by the temperature sensor.

5. The system of claim 3, wherein the data blocks include a numeric value data block that includes a number selector that is operable to specify one of a plurality of numbers in a range, and wherein the coding circuitry of the numeric value block generates a number value that corresponds to the number selected by the number selector.

6. The system of claim 3, wherein the data blocks include an operator block that includes an operator selector that is operable to select once of a plurality of operators, and the coding circuitry of the operator block is configured to coding data representative of the selected operator.

7. The system of claim 2, wherein the sets of logic blocks includes a repeat block set, the repeat block set including:
   a first block that includes count selector that is operable to specify a count number, and that connects to a first connector of coded blocks in a sequence of one or more coded blocks; and
   a second block that connects to a second connector of a coded block in the sequence of the one or more coded blocks;
   wherein the coding circuitry of first block and the coding circuit of the second block are operatively associated to generate coding data that specifies a sequence of commands generated from the coding data of a sequence of one or more coded blocks to which the first block and second block are connected is to be performed a number of times that is equal to the count number.

8. The system of claim 2, wherein the sets of logic blocks includes a branch block set, the block set including:
a first block that includes parallel first connectors, wherein one of the parallel first connectors corresponds to a first condition, and the other of the parallel first connectors corresponds to a second condition that is exclusive of the first condition; and
a second block that includes parallel second connectors, wherein one of the parallel second connectors corresponds to one of the parallel first connectors, and the other of the parallel second connectors corresponds to the other of the parallel first connectors;
wherein the coding circuitry of first block and the coding circuit of the second block are operatively associated to generate coding data that specifies that one of a first sequence of commands generated from a first sequence of one or more coded blocks connected to one of the parallel first connectors or a second sequence of commands generated from a second sequence of one or more coded blocks connected the other of the parallel first connectors is to be performed according to the occurrence of the first condition or the second condition.

9. The system of claim 2, wherein the sets of logic blocks includes a jump block set, the block set including:
a first block that includes a number selector that is operable to specify one of a plurality of numbers in a range, and wherein the coding circuitry of the jump block generates coding data that specifies a number of a sequence of commands corresponding to a number of coded blocks equal to the specified number are skipped when a condition is true.

10. The system of claim 2, wherein the action blocks include a move block, the action block including:
a move selector that is operable to selector one of a plurality of movement directions; and
wherein the coding circuitry of the move block generates coding data that specifies a move command and the movement direction.

11. The system of claim 2, wherein the action blocks include a programmable task block, the programmable task configured to be associated with one of a plurality of task that is to be performed in a code sequence, and wherein the coding circuitry of the programmable task block generates coding data that specifies a task command and the associated task to be performed.

12. The system of claim 1, wherein the sequence of commands corresponding to the control flow is modifiable during a compiling of the received coding data.

13. A computer implemented method, comprising:
receiving, at a sequencer block in data communication with a sequence of a plurality of coded blocks including one or more of data blocks and logic blocks that are connected in a sequence that is representative of a control flow, coding data from each of the coded blocks in the plurality of coded blocks generated based on programming each of the coded blocks, the coding data for each block representative of an instruction code which is modifiable depending on a function corresponding to the coded block, and wherein the sequence of the plurality of coded blocks comprise physical blocks that are physically configured to be connected to each other by connectors by a user to arrange a physical manifestation of the control flow, each coded block being a separate physical block that can be connected to one or more other of the coded blocks by a connector, and further wherein the coding data includes values selected using selectors respectively included in at least one of each of the data blocks and logic blocks and being manipulated by a user to select one of two or more different values;
generating, from the coding data, a sequence of commands that corresponds to the control flow of which the coded blocks in data communication with the sequencer block are representative, wherein the sequence of commands corresponding to the control flow is modifiable while the coded blocks are connected in the sequence and based on programming of the coded blocks and the values selected by use of the selectors of the coded blocks; and
providing the sequence of commands to a controlled system that is external to the sequencer block and the coded blocks, wherein the controlled system performs the sequence of commands.

14. The method of claim 13, wherein receiving coding data from each of the coding blocks comprises receiving the coding data through a serial communication port.

15. The method of claim 13, wherein providing the sequence of commands to a controlled system that is external to the sequencer block and the coded blocks comprises providing the sequence of commands through a wireless communication protocol.

16. The method of claim 13, further comprising:
receiving, at the controlled system, the sequence of commands; and
executing the sequence of commands by the controlled system.

17. The method of claim 16, further comprising:
determining, from the sequence of commands received at the controlled system, the sequence of coded blocks that is representative of the control flow; and
generating, on a user interface display on the controlled system, a graphical depiction of the sequence of coded blocks.

18. A system comprising:
a sequencer block, including:
a first connector configured to mate with a corresponding connector of a coded block connected in a sequence of a plurality of coded blocks including one or more of data blocks and logic blocks representative of a control flow and establish data communication with the sequence of the plurality of coded blocks, wherein the sequence of the plurality of coded blocks comprise physical blocks that are physically configured to be connected to each other by connectors by a user to arrange a physical manifestation of the control flow, each coded block being a separate physical block that can be connected to one or more other of the coded blocks by a connector and further wherein the coding data includes values selected using selectors respectively included in at least one of each of data blocks and logic blocks and being manipulated by a user to select one of two or more different values;
coding circuitry that:
receives coding data from the sequence of the plurality of coded blocks, the coding data generated based on programming each of the coded blocks and representative of instruction code which is modifiable depending on a function corresponding to each of the coded blocks, and generates from the received coding data command data that is representative of a sequence of commands that corresponds to the control flow of which the coded blocks in data communication with the sequencer block are representative, wherein the sequence of commands corresponding to the control flow is modifiable while the coded blocks are connected in the sequence and based on the programming of the coded blocks and the values selected by use of the selectors of the coded blocks; and a communication subsystem that provides the command data to a controlled system that is external to the coded blocks.

19. The system of claim 18, wherein the command data comprises a sequence of commands.

20. The system of claim 18, wherein the command data comprises a mapping of coded block identifiers that specifies how the coded blocks are sequenced together, and values that specify parameter values for one or more coded blocks.

21. The system of claim 18, wherein the coding data received from each coded block is a complete command sequence for the coded block.

22. The system of claim 18, wherein the coding data received from each coded block specifies a function type for the coded block.

* * * * *